Patented July 29, 1947

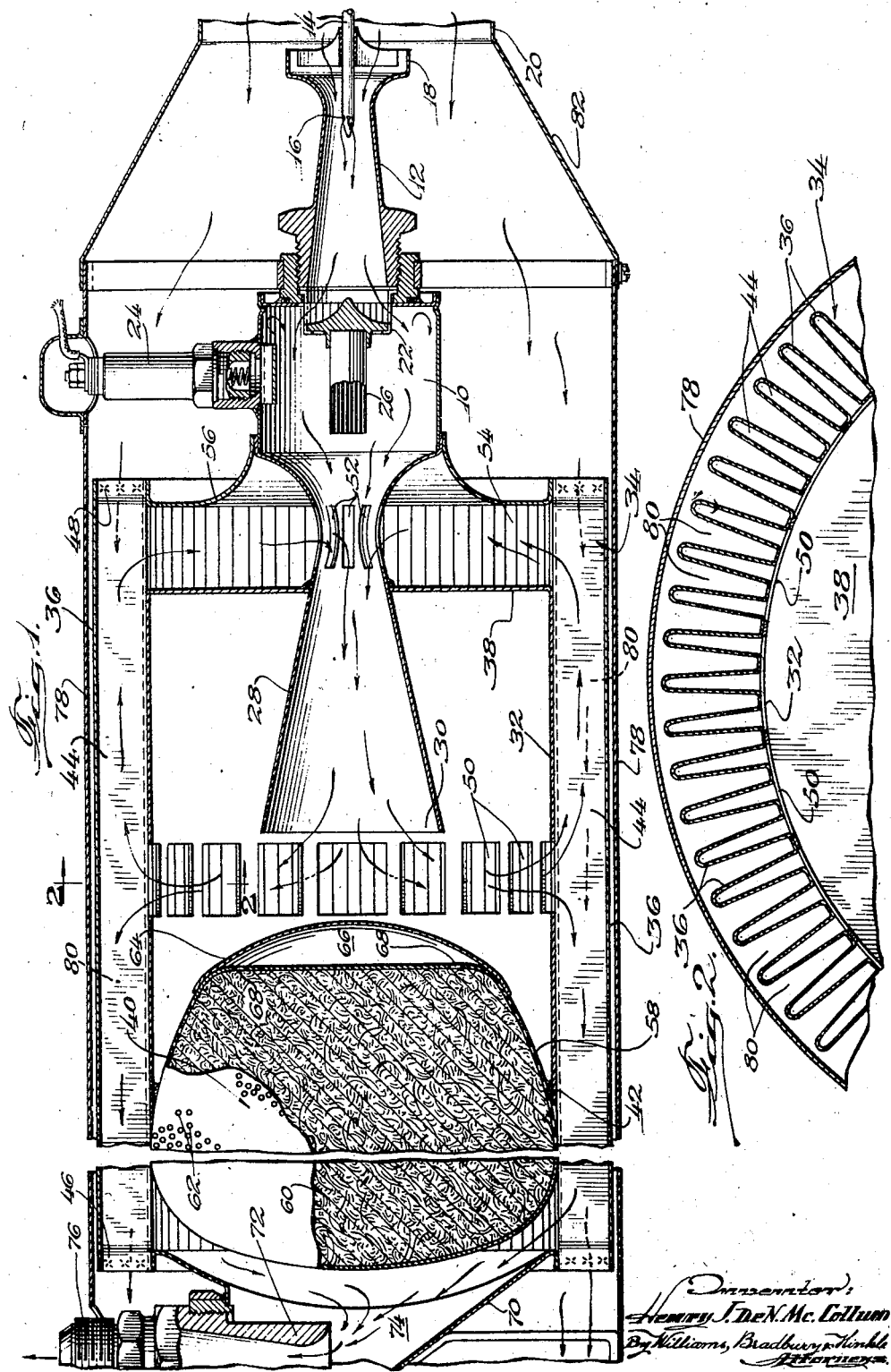

2,424,765

UNITED STATES PATENT OFFICE 2,424,765

HOT-AIR HEATER HAVING MEANS TO RECIRCULATE COOLED GASES

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application October 6, 1942, Serial No. 460,971

3 Claims. (Cl. 126—116)

My invention relates to heating apparatus and more particularly to heaters of the internal combustion type especially adapted for, but not limited to, use in aircraft.

In heaters of the internal combustion type, it is common to provide finned heat transfer means for transferring heat from the products of combustion to the ventilating air directed over the heat transfer means by a ram or blower, or other air circulating means. The heated products of combustion are originally directed against the fins at one end of the heat transfer means and where the hot products of combustion first come in contact with these fins, the fins are raised to a temperature which is much in excess of the temperature of other portions of the fins and particularly that portion adjacent the outlet end of the heater. There is a practical limit to the temperature to which any portion of the fins can be heated and where large portions of these fins are maintained at a temperature materially lower than this limit, the total heat output of the heater is materially below the possible output for that heater.

An object of my invention is to provide heating apparatus of the internal combustion type in which local hot spots are eliminated and the heat transfer means is heated to a substantially uniform temperature throughout its length.

Another object of my invention is to provide heating apparatus wherein the temperature range between different parts of the heat transfer means is reduced to a minimum and stresses and strains caused by great variations in temperature of different portions of the heat transfer means are avoided.

Another object of my invention is to provide heating apparatus wherein all parts of the heat transfer means can be maintained at or about the practical temperature limit and maximum heat output thus attained.

Another object of my invention is to provide new and improved heating apparatus which is extremely light in weight and compact and has a high heat output.

Other objects and advantages will become apparent as the description proceeds.

In the drawings:

Fig. 1 is a view showing a longitudinal section through a preferred embodiment of my invention; and Fig. 2 is a view showing a partial, transverse section taken on the line 2—2 of Fig. 1.

The heating apparatus illustrated in the drawings comprises, in general, a combustion chamber 10 supplied with a combustible mixture of fuel and air by a carburetor 12. This carburetor is supplied with fuel, or a rich mixture of fuel and air, through a fuel supply pipe 14, having outlet openings 16 located in the restricted throat of the carburetor. The open end 18 of the carburetor is supplied with air from the heater inlet 20 which is adapted to be connected to a ram, blower or other air circulating means.

The combustible mixture passes from the carburetor 12 into a burner tube 22 which discharges this mixture into the combustion chamber 10 with a whirling motion. One or more electrical igniters 24 ignite the combustible mixture in the combustion chamber 10 and after the heater has been in operation a sufficient length of time to attain normal operating temperature, these igniters are cut off from their source of current supply by a thermostatic switch responsive to the temperature of the heater. A re-igniter 26 is provided to insure maintenance of combustion in the chamber 10 after the igniters 24 have been disconnected from their current source.

The hot gases or products of combustion formed in the chamber 10 are discharged from this chamber into the righthand end of a Venturi tube 28 having a mouth 30 located approximately centrally of a tubular liner 32. The liner 32 is located in a tubular heat transfer means or heat exchanger 34 having hollow fins 36 extending lengthwise thereof. One end of the liner 32 is closed by an end member 38 which may be an integral part of the liner itself and the other end of the liner is closed by a muffler 40 which is illustrated as being welded at 42 to the lefthand end of the liner 32.

The hollow fins 36 have gas passages 44 extending lengthwise of the interiors thereof, the ends of these passages being closed by pinching together the sides of the extreme ends of the hollow fins, as indicated at 46 and 48 in Fig. 1, or by sealing the ends of these hollow fins in any other suitable manner. The liner 32 has an annular series of openings 50 arranged in a plane adjacent the mouth of the Venturi tube 28 and these openings provide communication between the mouth of the Venturi tube and the passages 44 in the hollow fins.

The Venturi tube 28 has a restricted throat provided with an annular series of slots 52 providing communication between the interior of this throat and an annular space 54 between the end 38 of the liner 32 and a plate 56 which connects the inlet end of the heat exchanger 34 with the inlet end of Venturi tube 28. This space 54 is in open communication with the righthand ends of the passages 44 in the hollow fins.

The muffler 40 comprises a sheet metal shell 58 containing a quantity of sound absorbing material 60, such as glass wool or stainless steel wool. Openings 62 in the muffler shell form acoustic couplings between the interior of this shell and the interior of the liner 32 and also between the interior of the muffler shell and the passages 44 in the hollow fins. A rounded metal cap 64 is attached to the righthand end of the muffler shell and cooperates therewith to form a combination heat insulating and resonance chamber 66, which is acoustically coupled to the interior of the muffler shell by opening 68.

The lefthand end of the tubular heat exchanger 34 is closed by a plate 70 carrying an outlet fitting 72. An outlet chamber 74 is formed between the plate 70 and the lefthand end of the muffler 40 and receives the cooled gases flowing thereinto from the lefthand ends of the passages 44 in the hollow fins. These gases are discharged to atmosphere through the outlet fitting 72 and any suitable exhaust pipe attached to the threaded end 76 of this fitting.

A tubular casing 78 of sheet metal, or other suitable material, encloses the heat exchanger 34 and cooperates therewith to form ventilating air passages 80 between the hollow fins 36. The righthand end of the casing 78 is connected to a conical extension 82 of the inlet 20 and receives ventilating air therefrom. The lefthand end of the casing 78 may discharge directly into an aircraft cabin or other space to be heated, or into a system of ducts for conducting the heated ventilating air to selected locations.

In the operation of my novel heating apparatus, the carburetor 12 supplies a combustible mixture to the combustion chamber 10 and this mixture is fired by the electrical igniters 24. The hot gases of combustion flow from the lefthand end of the combustion chamber 10 into the Venturi tube 28 and are discharged from the mouth thereof into the liner 32. These gases then pass through the openings 50 in this liner into the passages 44 in the interiors of the hollow fins at points spaced some distance from the righthand ends of these passages. Part of these gases flow to the left and give up their heat to the heat exchanger 34. This part of the gases then enters the outlet chamber 74 and is discharged to atmosphere through fittings 72 and the exhaust pipe connected thereto.

The remainder of the gases entering the interiors of the hollow fins through openings 50 flow to the right in the passages 44 where they give up the major portion of their heat to the corrugated wall by which the fins 36 are provided. Since the fresh ventilating air being heated passes directly to the righthand end portions of the fins 36 in Fig. 1 with very little preliminary change in temperature, such cold air is highly effective for cooling the fins, serving thus to provide a very rapid and effective transfer of heat to such ventilating air and to prevent the development of hot spots in the walls of the fins. From the inside passages 44, the combustion gases enter the space 54, which communicates with the righthand ends of these passages. The hot products of combustion flowing through the restricted throat of the Venturi tube 28 from the combustion chamber 10 create a suction therein which draws gases from the space 54 through the openings 52 and into the interior of the Venturi tube where these gases mix with the hot products of combustion from the combustion chamber 10. The gases flowing from the space 54 into the Venturi tube 28 have given up most of their heat to the righthand end portion of the heat exchanger 34 and are much cooler than the hot products of combustion leaving the combustion chamber 10. The intermixing of the cooled products of combustion from the space 54 with the hot products of combustion from the combustion chamber materially cools the latter and reduces the temperature of the gases flowing through openings 50 into the passages in the hollow fins.

With a proper proportioning of the parts, that portion of the hot gases which is flowing to the right in the hollow fins will heat the righthand ends of these fins to the same temperature as the main portions of these fins are heated by the gases flowing to the outlet chamber 74. Furthermore, the cooling of the hot products of combustion which is effected by mixing these products with the cooled recirculating products of combustion avoids the formation of intensely hot spots in the heat exchanger adjacent the openings 50. These advantages are effected with a minimum of additional structure and without the necessity of providing moving parts for creating the recirculation of the products of combustion. Such additional parts as are necessary may be made of lightweight material and do not substantially increase the weight or size of the heating apparatus.

Since my invention eliminates hot spots from the heat exchanger, the entire area of this heat exchanger may be operated at substantially the practical temperature limit for the particular material of which it is made. In practice the walls of the heater are made as thin as is possible consistent with a reasonable margin of safety with respect to the ability of the walls to resist burning out. My improved construction which causes a substantially more even application of the heat to the walls of the heater so as to avoid the development of hot spots is accordingly very important. My novel heating apparatus thus provides the maximum heat output for a given size and makes possible the provision of a compact and lightweight heater having a maximum heat output.

While I have illustrated and described only a single embodiment of my invention, it is to be understood that my invention is not limited to the particular details shown and described but may assume numerous other forms and that my invention is to be construed as including all modifications and variations falling within the scope of the appended claims.

I claim:

1. Heating apparatus of the class described, comprising a tubular heat exchanger, means forming a combustion chamber at one end thereof, a Venturi tube connected to one end of said combustion chamber and receiving hot products of combustion therefrom, said Venturi tube having an outlet communicating with the intermediate portion of said heat exchanger, said Venturi tube having a restricted throat provided with openings, means adapted by the suction effect of said Venturi tube to conduct a part of the gases discharged by said Venturi tube backwardly through a portion of the heat exchanger and then to said openings to provide recirculation of cooled products of combustion and an admixture of such cooled products of combustion with fresh products of combustion discharged from said combustion chamber, for substantially cutting down the temperature of said products of combustion prior to contact with the heat exchanger, and means for directing ventilating air forwardly in close contact first with the portion of the heat exchanger through which the gas flows backwardly and then with the remaining portion for heating the air and protecting the heat exchanger from burning out.

2. Heating apparatus of the class described, comprising a tubular heat exchanger having hollow fins extending lengthwise thereof, a muffler located in one end of said heat exchanger, a liner located in the other end of said heat exchanger, said liner having a closed end and an open end connected to said muffler, said liner being provided with gas ports intermediate its ends, means forming a combustion chamber for supplying hot gases to the interior of said liner, said hollow fins providing gas passages communicating with the interior of said liner through said ports, and a Venturi tube interposed between said liner and combustion chamber, said Venturi tube having a restricted throat communicating with one end of said hollow fins and functioning to create a recirculation of gases and mixture of these recirculated gases with gases leaving said combustion chamber.

3. In a heating apparatus of the class described, the combination of a heat transfer member formed of sheet metal provided with deep, longitudinal corrugations from end to end thereof, a casing surrounding said member so as to provide outside passages for air along the full length of said member between the corrugations and the casing, means for feeding hot products of combustion into the inside passages between the corrugations at an intermediate point along the heat transfer member, means for feeding cold ventilating air forwardly into one end of said casing for movement through said outside passages, liner means for said heat transfer member in engagement with the inner edges of said corrugations at the portions adjacent to the position at which the hot products of combustion are delivered thereto for causing such products of combustion to flow through said inside passages between the corrugations and serving to assist in the absorption of the heat at said intermediate point, and means at the end portion of said heat transfer member adjacent to the position at which said ventilating air is delivered into said casing adapted by a suction effect to draw a portion of said hot products of combustion backwardly along the rear end portions of said inside passages for delivery with the fresh products of combustion.

HENRY J. DE N. McCOLLUM.

REFERENCES CITED

The following references are of record in the file of this patent:

UNITED STATES PATENTS

| Number | Name | Date |
|---|---|---|
| 1,737,681 | Plassman | Dec. 3, 1929 |
| 1,671,448 | Plassman | May 29, 1928 |
| 1,614,359 | Gaston | Jan. 11, 1927 |
| 1,633,549 | Little | June 21, 1927 |
| 1,790,870 | Mantle et al. | Feb. 3, 1931 |
| 2,224,544 | Keller | Dec. 10, 1940 |